(No Model.) 2 Sheets—Sheet 1.
E. SCHEIBLICH.
MACHINE FOR SCATTERING MANURE.
No. 545,097. Patented Aug. 27, 1895.
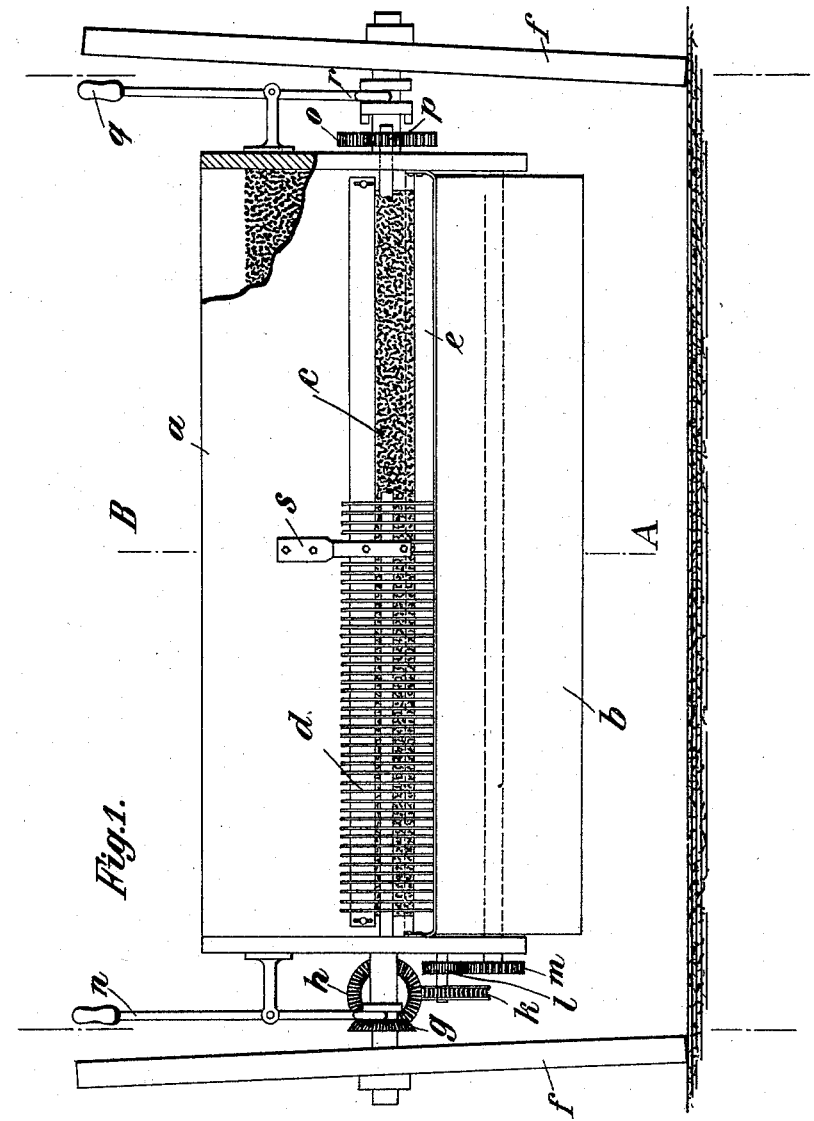
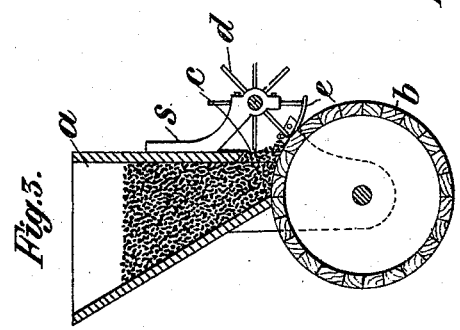
Witnesses:
Inventor:
Eduard Scheiblich
by his attorneys (No Model.) 2 Sheets—Sheet 2.

E. SCHEIBLICH.
MACHINE FOR SCATTERING MANURE.

No. 545,097. Patented Aug. 27, 1895.

Witnesses

Inventor:
Eduard Scheiblich
by his attorneys

UNITED STATES PATENT OFFICE.

EDUARD SCHEIBLICH, OF KIBITZBERG, GERMANY.

MACHINE FOR SCATTERING MANURE.

SPECIFICATION forming part of Letters Patent No. 545,097, dated August 27, 1895.

Application filed August 16, 1894. Serial No. 520,529. (No model.) Patented in Belgium May 9, 1894, No. 109,905; in Austria May 21, 1894, No. 44/1,753, and in England July 14, 1894, No. 13,621.

*To all whom it may concern:*

Be it known that I, EDUARD SCHEIBLICH, landlord, of Kibitzberg, near Meyenburg, in the Kingdom of Prussia, Germany, have invented certain new and useful Improvements in Machines for Scattering Manure, (for which I have obtained patents in England July 14, 1894, No. 13,621; in Belgium May 9, 1894, No. 109,905, and in Austria May 21, 1894, No. 44/1,753;) and I do hereby declare that the following is a full and exact description thereof, reference being had to the accompanying drawings, and to the figures of reference marked thereon, making a part of this specification.

My invention relates to a machine for scattering manure, and is shown in the accompanying drawings, in which—

Figure 4:
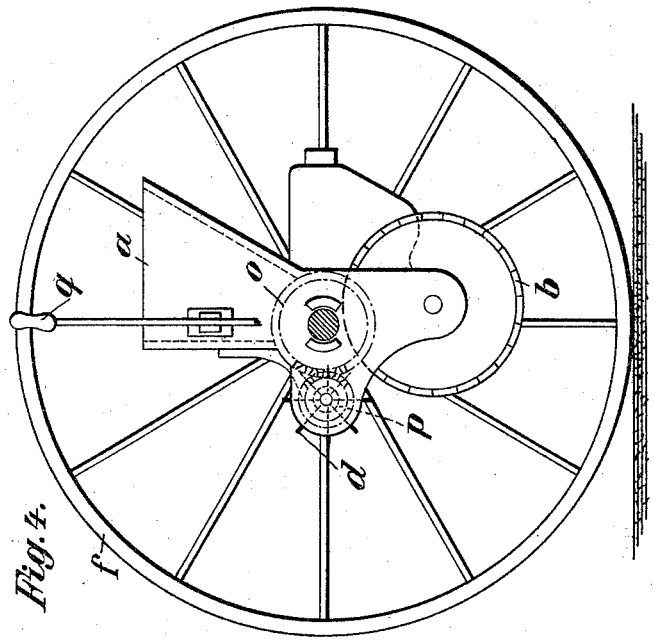
Figure 2:
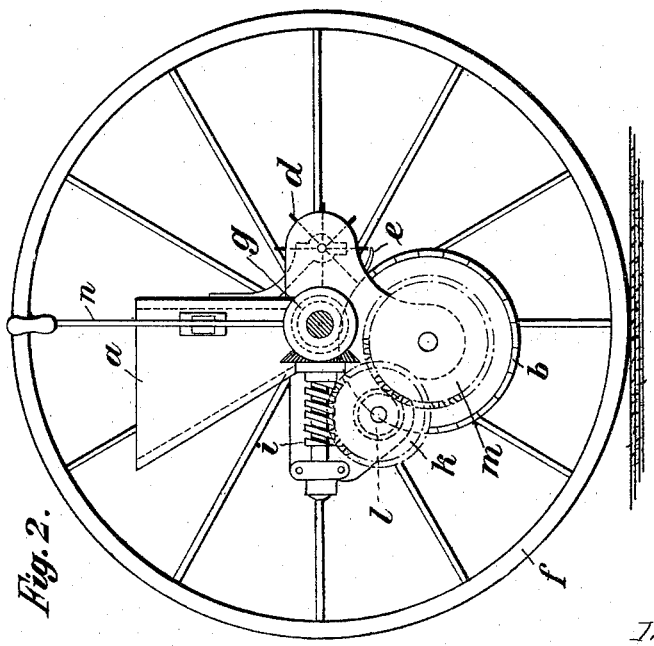

Figure 1 is a rear view of the machine; Fig. 2, a view of the left side without wheel $f$; Fig. 4, a view of the right side without wheel $f$. Fig. 3 is a section on the line A B of Fig. 1.

The machine, which is mounted on wheels $f$, consists, essentially, of a chest or hopper $a$, holding the manure, a revolving drum beneath $b$, and distributing apparatus, consisting of a revolving wheel or strew-roller, furnished with radial arms $d$ and a strew-plate $e$ beneath, attached near to the drum $b$. The revolving drum $b$ closes the lower opening of the manure-chest $a$. The manure is allowed to escape through an opening $c$ at the back of the chest $a$. The manure is carried by the radial arms over the aforesaid strew-plate $e$, which has a curve corresponding to the exterior circumference of the radial arms, and is placed so that very little room lies between the strew-plate $e$ and the radial arms at one part of their revolution. The drum $b$ is caused to revolve by means of suitable gearing $h\ g\ k\ l\ m$, connected with one of the wheels $f$. This gearing can be disconnected, when required, by means of the lever $n$. The wheel with radial arms is also caused to revolve by means of suitable gearing connected with the other wheel $f$, and this also can be disconnected by means of the lever $q$.

Having now described my invention, what I claim, and desire to secure by Letters Patent, is—

A machine for scattering manure characterized by a chest ($a$) above the drum ($b$), said chest serving essentially to hold the manure and provided with a strew-roller ($d$) and a strew-plate ($e$), the latter curved according to the radius of the strew-roller ($d$), whereby drum and strew-roller will get their motions independent one from another by the wheels ($f$) of the machine for scattering manure and whereby the very same can be disengaged by means of the levers ($n$) and ($q$).

In witness whereof I have hereunto signed my name in the presence of two subscribing witnesses.

EDUARD SCHEIBLICH.

Witnesses:
 CHAS. H. DAY,
 W. HAUPT.